United States Patent
Liu et al.

(10) Patent No.: US 8,645,479 B2
(45) Date of Patent: Feb. 4, 2014

(54) CHATTING SYSTEM, METHOD AND APPARATUS FOR VIRTUAL PET

(75) Inventors: Yunfeng Liu, Shenzhen (CN); Haisong Yang, Shenzhen (CN); Zhiyuan Liu, Shenzhen (CN); Rongling Yu, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 987 days.

(21) Appl. No.: 12/647,986

(22) Filed: Dec. 28, 2009

(65) Prior Publication Data

US 2010/0106789 A1    Apr. 29, 2010

Related U.S. Application Data

(63) Continuation of application No. PCT/CN2008/070642, filed on Mar. 31, 2008.

(30) Foreign Application Priority Data

Jun. 28, 2007    (CN) .......................... 2007 1 0127501

(51) Int. Cl.
- *G06F 15/16* (2006.01)
- *G10L 15/00* (2013.01)
- *G10L 15/04* (2013.01)
- *G10L 15/18* (2013.01)

(52) U.S. Cl.
USPC ............ 709/206; 709/202; 704/251; 704/257

(58) Field of Classification Search
USPC ........................ 709/206, 202; 704/251, 257
See application file for complete search history.

(56) References Cited

U.S. PATENT DOCUMENTS

| 5,895,466 A | 4/1999 | Goldberg et al. |
| 6,722,989 B1 | 4/2004 | Hayashi |
| 6,792,406 B1 * | 9/2004 | Fujimura et al. .............. 704/257 |

(Continued)

FOREIGN PATENT DOCUMENTS

| CN | 1455357 A | 11/2003 |
| CN | 1462939 A | 12/2003 |

(Continued)

OTHER PUBLICATIONS

Canadian Office Action for Canadian Patent Application No. 2,691,930, dated Mar. 2, 2012.

(Continued)

*Primary Examiner* — Oscar Louie
*Assistant Examiner* — Lin Liu

(57) ABSTRACT

Embodiments of the present invention provides a chatting system for a virtual pet, including a pet client, configured to receive a natural language sentence of a pet master, and send the natural language sentence to a virtual pet server; the virtual pet server, configured to forward the natural language sentence to a questioning and answering server, and return a natural language response to the pet client; the questioning and answering server, configured to perform processing of natural language understanding on the natural language sentence, obtain language characteristics of the pet master, generate the natural language response according to a natural language understanding result and the language characteristics of the pet master, and return the natural language response to the virtual pet server. Embodiments of the present invention further provide a chatting method for a virtual pet and a questioning and answering server.

15 Claims, 4 Drawing Sheets

(56) References Cited

U.S. PATENT DOCUMENTS

| | | | |
|---|---|---|---|
| 7,702,508 B2 * | 4/2010 | Bennett | 704/257 |
| 2001/0053968 A1 | 12/2001 | Galitsky et al. | |
| 2002/0098879 A1 * | 7/2002 | Rheey | 463/1 |
| 2003/0033428 A1 * | 2/2003 | Yadav | 709/238 |
| 2003/0080989 A1 | 5/2003 | Matsuda et al. | |
| 2004/0193421 A1 | 9/2004 | Blass | |
| 2009/0216691 A1 * | 8/2009 | Borzestowski et al. | 706/11 |
| 2010/0311030 A1 * | 12/2010 | He et al. | 434/350 |

FOREIGN PATENT DOCUMENTS

| | | |
|---|---|---|
| CN | 1735027 A | 2/2006 |
| CN | 101075301 A | 11/2007 |
| JP | 11212934 A | 8/1999 |
| WO | 2006036328 A1 | 4/2006 |

OTHER PUBLICATIONS

Great Britain Office Action for Great Britain Application No. GB1001438.9; dated Jan. 9, 2012.

Great Britain Office Action for Great Britain Application No. GB1001438.9; dated Jun. 16, 2011.

International Search Report for International Patent Application No. PCT/CN2008/070642, dated Jul. 10, 2008, and English translation thereof.

Canadian Office Action for Canadian Patent Application No. 2,691,930, dated Oct. 1, 2012.

British Office Action for British Patent Application No. GB1001438.9, dated May 16, 2012.

British Decision for British Patent Application No. GB1001438.9, dated Aug. 8, 2012.

* cited by examiner

CHATTING SYSTEM, METHOD AND APPARATUS FOR VIRTUAL PET

CROSS-REFERENCE TO RELATED APPLICATIONS

This application is a continuation of International Application No. PCT/CN2008/070642, filed Mar. 31, 2008. This application claims the benefit and priority of Chinese Patent Application No. 200710127501.6, filed Jun. 28, 2007. The entire disclosures of each of the above applications are incorporated herein by reference.

FIELD

The present disclosure relates to a field of artificial intelligence technology, and more particularly, to a chatting system, method and apparatus for a virtual pet.

BACKGROUND

This section provides background information related to the present disclosure which is not necessarily prior art.

Along with the increasing popularization of computers and computer networks, the Internet has been widely used in fields of people's working, study and daily life. In recent years, a virtual pet has gradually become more and more favorable entertainment software of Internet users. The virtual pet has a cartoon and virtual image, and some intelligent virtual pets even have certain characters. A user of the virtual pet may experience entertainment through interactive actions, such as "feeding" the virtual pet or playing a game with the virtual pet.

Substantially, the virtual pet is one type of software systems with entertainment characteristics, may independently run on the computer desktop of the user or exist as a component of a webpage. The virtual pet may run in the Internet environment, or independently run on an offline computer.

Although, at present, the virtual pet has certain intelligence, the intelligence is simply limited to interactions with a pet master through clicking the mouse or inputting specific command symbols. The mode of interactions is too simple, and thus the user can not enjoy more intellectualized entertainment experiences.

Besides, many users of virtual pets expect that virtual pets fed by the users can communicate with them in natural languages, and even expect that the virtual pets fed by the users can learn their language characteristics. However, all of these functions can not be implemented by the conventional virtual pets.

SUMMARY

This section provides a general summary of the disclosure, and is not a comprehensive disclosure of its full scope or all of its features.

An embodiment of the present invention provides a chatting system for a virtual pet, including a pet client, configured to receive a natural language sentence of a pet master, and send the natural language sentence to a virtual pet server;

the virtual pet server, configured to forward the natural language sentence to a questioning and answering server, and return a natural language response to the pet client;

the questioning and answering server, configured to perform natural language understanding processing on the natural language sentence, obtain language characteristics of the pet master, generate the natural language response according to natural language understanding result and the language characteristics of the pet master, and return the natural language response to the virtual pet server.

Another embodiment of the present invention provide a virtual pet chatting method, including receiving a natural language sentence of a pet master;

performing natural language understanding processing on the natural language sentence;

obtaining and saving language characteristics of the pet master; and generating a natural language response according to natural language understanding result and the saved language characteristics of the pet master.

Yet, another embodiment of the present invention provides a questioning and answering server, including a sentence understanding engine unit, configured to perform natural language understanding processing on a received natural language sentence, respectively send natural language understanding result to a learning engine unit and a reasoning engine unit, and send out a natural language response generated by the reasoning engine unit;

the learning engine unit, configured to obtain language characteristics of a pet master according to the natural language understanding result, and save the language characteristics in a pet master language information base; and the reasoning engine unit, configured to generate the natural language response according to the natural language understanding result and the language characteristics of the pet master; and the pet master language information base, configured to save the language characteristics of the pet master.

As can be seen from the above technical scheme, in embodiments of the present invention, after performing the processing of the natural language understanding on the natural language sentence, the language characteristics of the pet master are obtained and saved in the pet master language information base. When generating the natural language response, the natural language response is generated according to the natural language understanding result and the language characteristics of the pet master. Thus, after applying the embodiments of the present invention, the conversation between the virtual pet and the pet master may be achieved by fully using the artificial intelligent technologies and the natural language processing ability, which makes the virtual pet much more intelligent and recreational. In addition, the virtual pet keeps learning the language characteristics of the master and uses the language embodying the language characteristics of the pet master, which makes the relation between the user and the virtual pet closer and enables the user to enjoy much more intelligent entertainment experiences.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The present invention is further described in detail hereinafter with reference to the accompanying drawings to make the objective, technical solution and merits thereof more apparent.

Figure 1:
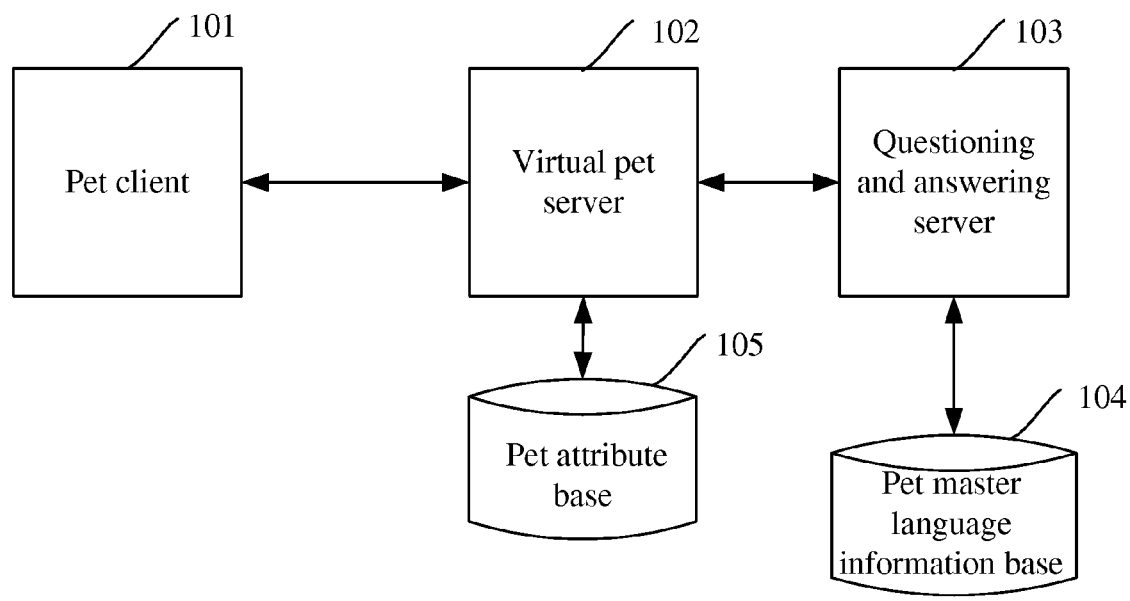
FIG. 1 is a schematic diagram illustrating a structure of a chatting system for a virtual pet according to a first embodiment of the present invention.

FIG. 1 is a schematic diagram illustrating a structure of a chatting system for a virtual pet according to a first embodiment of the present invention.

As illustrated in FIG. 1, the chatting system for a virtual pet in the first embodiment of the present invention includes: a pet client 101, a virtual pet server 102, a questioning and answering server 103, a pet master language information base 104 and a pet attribute base 105.

The pet client 101 is configured to receive a natural language sentence from a pet master, and send the natural language sentence to the virtual pet server 102.

Preferably, the pet client 101 may be desktop software or a virtual pet component in a webpage. The pet client 101 may also be included into a tool, such as an Instant Messaging (IM) tool, or be a totally independent function module.

The virtual pet server 102 is configured to: manage the pet attribute base 105, forward the natural language sentence to the questioning and answering server 103, and send a natural language response returned by the questioning and answering server 103 to the pet client 101.

Specifically, the virtual pet server 102 is configured to add, delete and update status information of the virtual pet in the pet attribute base 105, and send the status information of the virtual pet to the questioning and answering server 103. The status information of the virtual pet includes: pet attributes, pet master attributes and pet properties, etc. Preferably, the status information of the virtual pet may be edited by a user. The pet attributes refer to status information of the pet itself, such as whether the pet needs be fed, whether the pet needs bathing, and whether the pet has finished the work, etc. The pet master attributes refer to status information of the master, such as the highest education qualification, jobs, and married or not, etc. The pet properties refer to status information of properties that can be used by the pet, such as clothing information, shoes information and spectacular stunt information of the pet, etc. In the following embodiments, the status information of the virtual pet, i.e. the pet attributes, pet master attributes and pet properties is the same as that of this embodiment.

Preferably, the virtual pet server 102 may not have the function of managing the pet attribute base 105, but merely have the function of forwarding the natural language sentence to the questioning and answering server 103 and send the natural language response returned by the questioning and answering server 103 to the pet client 101. Thus, the system may not include the pet attribute base 105, which is a simplified instance of this embodiment of the present invention and will not be described in detail here.

The questioning and answering server 103 is configured to perform natural language understanding on the natural language sentence after receiving the natural language sentence forwarded by the virtual pet server 102, obtain and save language characteristics of the pet master to the pet master language information base 104. The questioning and answering server is further configured to generate the natural language response according to a natural language understanding result, the language characteristics of the pet master, the pet attributes and/or pet master attributes, and return the natural language response to the virtual pet server 102.

The pet master language information base 104 is configured to save the language characteristics of the pet master. The language characteristics of the pet master refer to response habits commonly used by the user for responding to a certain natural language, e.g. the user is used to responding to a question with a rhetorical question and this expression habit is recorded as a kind of characteristics into the pet master language information base 104. After analyzing that the natural sentence is a question, a corresponding answer in the form of the rhetorical question is generated according to the characteristics. The language characteristics of the pet master are different from the pet master attributes since the latter merely represent the status information of the pet master but do not relate to the language expression habit of the pet master. In the following embodiments, the language characteristics of the pet master are similar to those in this embodiment.

As illustrated in FIG. 1, the pet master language information base 104 is independently set relative to the questioning and answering server 103. Alternatively, the pet master language information base 104 may also be embedded into the questioning and answering server 103, functioning as one component of the questioning and answering server 103.

The pet attribute base 105 is configured to save the pet attributes and/or pet master attributes.

Preferably, besides saving the pet attributes and/or pet master attributes, the pet attribute base 105 is further configured to save other attributes relating to the pet, such as the pet properties, etc. The information saved by the pet attribute base 105 is stored in a database form or other forms, and may be stored in the virtual pet server 102 or another server. The virtual pet server 102 may perform management operations on the status information of the virtual pet in the pet attribute base 105, such as reading, modification and updating, etc.

Preferably, in order to simplify the system or save costs, the system described in the first embodiment of the present invention may not be include the pet master language information base 104. Thus, if the pet attribute base 105 saves the pet master attributes and/or pet attributes, the questioning and answering server 103 may perform the natural language understanding on the natural language sentence; generate the natural language response according to the natural language understanding result, the language characteristics of the pet master (the language characteristics of the pet master may be saved in the questioning and answering server 103 in advance), the pet master attributes and/or pet attributes; and return the natural language response to the virtual pet server 102.

As illustrated in FIG. 1, the pet master language information base 104 is provided in the first embodiment of the present invention, and the pet attribute base 105 saves the pet master attributes and/or pet attributes. Thus, the questioning and answering server 103 adjusts the language characteristics of the pet master in the pet master language information base 104 according to the natural language understanding result; generates the natural language response according to the natural language understanding result, the language characteristics of the pet master, and pet attributes and/or pet master attributes; and returns the natural language response to the virtual pet server 102.

Preferably, a communication platform may further be set between the pet client 101 and the virtual pet server 102. The communication platform is configured to transfer the natural language sentence and the natural language response between the pet client 101 and the virtual pet server 102. The communication platform may be an IM communication platform, a Short Messaging Service (SMS) communication platform, a Web communication platform or an Email communication platform, etc.

As illustrated in FIG. 1, the first embodiment of the present invention does not rely on the communication platform, but merely provides a stand alone system.

Preferably, in the first embodiment of the present invention, in order to support mass users, a dispatch server may be set between the communication platform and the virtual pet server 102. The dispatch server may connect with multiple groups of virtual pet servers 102 and questioning and answering servers 103. The dispatch server dispatches natural language sentences to each virtual pet server 102 according to a load balance principle to ensure the load balance of each pet servers 102 and questioning and answering servers 103.

If the first embodiment does not use the communication platform, the dispatch server may also directly connect with the pet client, and in this case, the number of the virtual pet servers 102 is at least two. The dispatch server is configured to receive the natural language sentences of the pet master, and dispatch the natural language sentences to each virtual pet server 102 according to the load balance principle.

Figure 2:
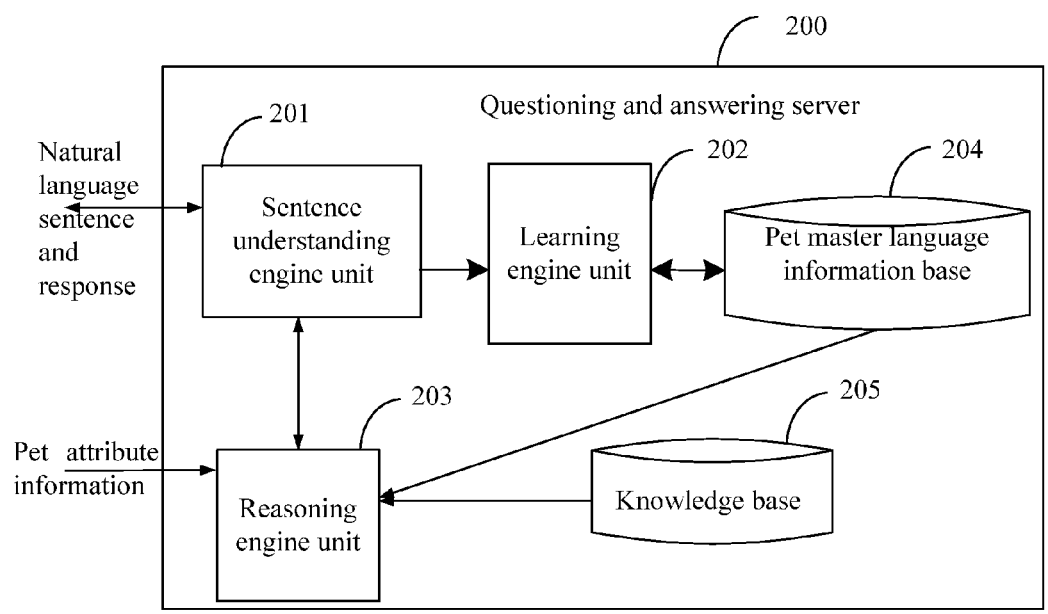
FIG. 2 is a schematic diagram illustrating an internal structure of a questioning and answering server according to a second embodiment of the present invention.

FIG. 2 is a schematic diagram illustrating the internal structure of the questioning and answering server 200 according to a second embodiment of the present invention. The questioning and answering server 200 may specifically include:

a sentence understanding engine unit 201, configured to perform natural language understanding on natural language sentences received, and send a natural language understanding result respectively to a learning engine unit and a reasoning engine unit;

the learning engine unit 202, configured to adjust the language characteristics of the pet master according to the natural language understanding result, history chatting records of the pet master, and stored language characteristics of the pet master; and save the adjusted language characteristics into the pet master language information base 204;

the reasoning engine unit 203, configured to receive the pet attributes and/or pet master attributes from the outside; generate a natural language response according to the natural language understanding result, reasoning knowledge stored in a knowledge base 205, pet attributes and/or pet master attributes, and the language characteristics of the pet master in the pet master language information base 204; and finally return the natural language response to the sentence understanding engine 201, and then to the virtual pet server;

the knowledge base 205, configured to store the reasoning knowledge; and the pet master language information base 204, configured to store the history chatting records between the pet master and the pet, and extract the language characteristics from the history chatting records.

Optionally, the knowledge base 205 may be independently set outside the questioning and answering server 200. Preferably, the knowledge stored by the knowledge base 205 may be edited by the virtual pet master. Preferably, the pet master language information base 204 may also be independently set outside the questioning and answering server 200.

Figure 3:
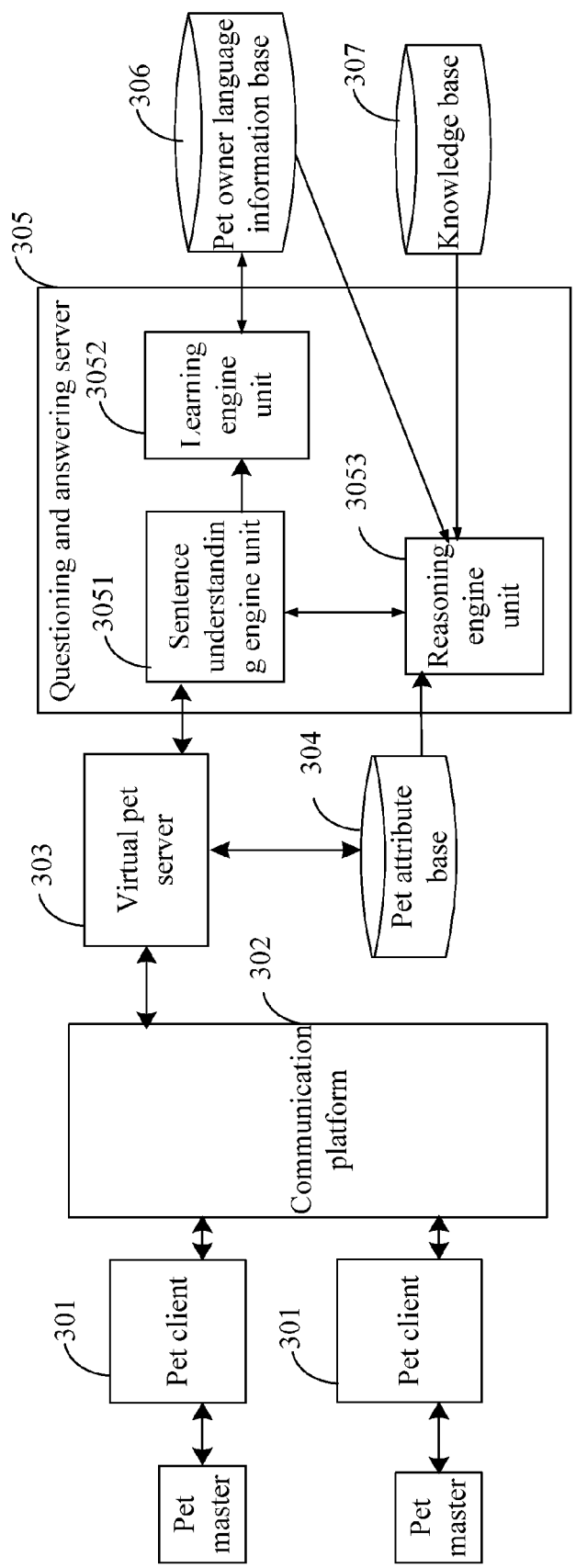
FIG. 3 is a schematic diagram illustrating a structure of a chatting system for a virtual pet according to a third embodiment of the present invention.

FIG. 3 is a schematic diagram illustrating a structure of a chatting system for a virtual pet according to a third embodiment of the present invention.

As illustrated in FIG. 3, the system in the third embodiment of the present invention at least includes a pet client 301, which may be desktop software or a virtual pet component in a webpage. Preferably, the pet client 301 may be independently set, or included in a tool such as an IM.

The system in the third embodiment of the present invention at least includes a pet master. Preferably, the system may include a communication platform 302, such as an IM platform. The system at least includes a virtual pet server 303, configured to manage status information of a virtual pet, such as the pet attributes, the pet master attributes and pet properties, etc. The virtual pet server 303 is further configured to forward a chatting sentence from the pet client 301 to a questioning and answering server 305, and return a response sentence obtained by the questioning and answering server 305 to the pet client 301. The system at least includes a pet attribute base 304, configured to store the status information of the virtual pet, such as the pet attributes, pet master attributes and the property attributes in a database form or a similar form.

The virtual pet server 301 reads or modifies the status information of the virtual pet in the pet attribute base 304.

The above system in the embodiment of the present invention at least includes the questioning and answering server 305, configured to respond to a natural language question when the virtual pet chats and speaks, and generate a natural language sentence imitating a pet response.

The questioning and answering server 305 is configured to extract the language characteristics of the pet master when processing the natural language question input by the pet master, save the language characteristics into the pet master language information base 306, and add the language characteristics in the pet response generated hereafter.

The system at least includes a knowledge base 307, configured to store knowledge required by the natural language reasoning. The knowledge base 307 store a great deal of knowledge needed by the natural language questioning and answering in the form of questioning and answering sentence pairs and in the specific format suitable for reasoning, so that a reasoning engine can access and use the knowledge.

The system at least includes a pet master language information base 306, configured to store history chatting records between the pet master and the pet, and extract the language characteristics from the history chatting records.

Both the knowledge base 307 and the pet master language information base 306 may be set inside the questioning and answering server 305.

The questioning and answering server 305 at least includes a sentence understanding engine unit 3051, a reasoning engine unit 3053 and a learning engine unit 3052.

The sentence understanding engine unit 3051 is configured to perform natural language understanding on an input sentence.

The reasoning engine unit 3053 is configured to generate a natural language response sentence.

The learning engine unit 3052 is configured to retrieve the language characteristics of the pet master, and save the language characteristics into the pet master language information base 306.

The sentence understanding engine unit 3051 performs the following processing of natural language understanding, such as obtaining a sentence trunk, determining a sentence type, determining a topic, etc. If the natural language adopted by the pet master and the pet is a language such as Chinese, the processing of natural language understanding performed by the sentence understanding engine 3051 further includes word segmentation.

The reasoning engine unit 3053 generates the natural language response sentence according to the understanding result of the sentence understanding engine 3051, the reasoning knowledge stored by the knowledge base 307, the pet attributes and pet master attributes in the pet attribute base 304, and the language characteristics of the pet master in the pet master language information base 306.

The reasoning engine unit 3053 uses the pet attributes and pet master attributes, e.g. uses a specific replacement sign in the question and response in the knowledge base, and replaces the location of the replacement sign with information of other origins when generating the final response. For instance, one response "My master studies at #MasterSchool#" has a replacement sign "#MasterSchool #". If an input question (such as, "Where does your master study") matches the question corresponding to the response, the location of the replacement sign is replaced by an attribute value of the pet master when the final response is generated. Suppose that the attribute value of the "MasterSchool" (a school at which the master studies) of the pet master is "Huazhong University of Science and Technology", the final response generated by the questioning and answering server 305 is "My master studies at Huazhong University of Science and Technology".

If the attribute value of "MasterSchool" of the master is null (The pet master has not submitted his/her attributes or the attributes of the pet master can not be obtained via other approaches), the questioning and answering server 305 generates another response "I do not know where my master studies, and I will ask her later".

A person skilled in the art of the present invention may understand that the above example is an example of the reasoning. Reasoning functions of the reasoning engine in embodiments of the present invention are not limited to this example.

For another example, if the master asks, "Are you hungry?", the pet may generate different responses according to whether it has been fed. Suppose that the pet has been fed, it answers, "I have just eaten a salmon and I am still burping; otherwise, it answers, "You are busying with your job all the while, and I am still hungry, 5555".

The learning engine unit 3052 retrieves the language characteristics of the pet master according to the understanding result of the sentence understanding engine unit 3051, and information stored in the pet master language information base 306, such as history chatting records and the language characteristics of the pet master.

For example, when the pet makes questions with a "yes or no" question, e.g. "Is your girlfriend pretty?" or "Are you handsome?", the pet master usually responds to the pet with a mode such as, "Of course, my girlfriend is quite pretty" and "Of course, there is no handsome man if I am not". Thus, the learning engine 3052 may learn a mood of "Of course" from the user as a positive answer of the "yes or no" question. The learning engine unit 3052 records this phenomenon. When this situation frequently and repeatedly occurs, the language character is held and saved in the pet master language information base 306 in a format suitable for searching and reasoning.

Hereafter, if the user asks, "Baby, how about your supper", the pet may respond to the pet master, "Of course, I am quite full". Thus, the language of the virtual pet is made much more vivid, and the user feels that the virtual pet is made much more intelligent and individualized.

In other words, the reasoning engine unit 3053 utilizes the pet master language information base 306 when reasoning and generating the natural language response of the virtual pet. For instance, the pet master asks the pet with the "yes or no" question (such as, "Baby, how about your dinner?"). The reasoning engine unit 3053 finds the language characteristics, such as a mood (e.g., "rhetorical question") and common expressions previously used by the pet master for answering the "yes or no" question; and generates the natural language response of the pet according to the language characteristics (e.g., "Of course, I am quite full").

Sometimes, as for one kind of questions of the pet master, multiple kinds of language characteristics are saved. Thus, the reasoning engine unit 3053 generates the response by selecting a most suitable language characteristic according to the chatting records, pet status attributes and the characteristics of the responses in the knowledge base 307.

In the system illustrated in FIG. 3, if receiving from the pet client 301 non-chatting messages, such as the status information of the virtual pet, such as the pet attributes, pet master attributes and pet properties, the virtual pet server 303 processes the non-chatting messages and directly returns a processing result to the virtual pet client 301. The non-chatting messages are not forwarded to the questioning and answering server 305, only chatting messages from the pet client are forwarded to the questioning and answering server 305.

The working flow adopting the system illustrated in FIG. 3 is described hereinafter.

When chatting with the pet, the pet master inputs a natural language sentence to the pet client 301. The pet client 301 sends the natural language sentence input by the pet master to the virtual pet server 303 via the communication platform 302. The virtual pet server 303 forwards the natural language sentence to the questioning and answering server 305.

The sentence understanding engine unit 3051 of the questioning and answering server 305 performs the processing of natural language understanding on the natural language sentence, including word segmentation, sentence trunk extraction, sentence type determination and topic determination; and sends a processing result respectively to the reasoning engine unit 3053 and the learning engine 3052.

The learning engine unit 3052 of the questioning and answering server 305 summarizes or adjusts the language characteristics of the pet master according to the processing result of the sentence understanding engine 3051, the history chatting records stored in the pet master language information base 306, and previously-stored language characteristics of the pet master; and saves the language characteristics of the pet master into the pet master language information base 306.

The reasoning engine unit 3053 of the questioning and answering server 305 generates the natural language response according to such information as the processing result of the sentence understanding engine unit 3051, the reasoning knowledge stored in the knowledge base 307, the pet attributes and pet master attributes in the pet attribute base 304, and the language characteristics of the pet master in the pet master language information base 306. The questioning and answering server 305 returns the natural language response to the virtual pet server 303, the virtual pet server 303 returns the natural language response to the pet client 301 via the communication platform 302, and the pet client 301 shows the pet master the natural language response.

A fourth embodiment of the present invention further provides a chatting method for a virtual pet.

The chatting method in the fourth embodiment of the present invention includes: receiving a natural language sentence of a pet master; performing the processing of natural language understanding on the natural language sentence; obtaining and saving language characteristics of the pet master into a pet master language information base; and generating a natural language response according to a natural language understanding result, the language characteristics of the pet master, and pet attributes and/or pet master attributes.

Preferably, the processing of the natural language understanding on the natural language sentence may include any one or any combination of operations including: word segmentation, question trunk extraction, question type determination and topic determination.

Specifically, the language characteristics of the pet master are obtained according to the natural language understanding result, history chatting records of the pet master, and previously-stored language characteristics of the pet master. The language characteristics obtained are saved into the pet master language information base. The natural language response is generated according to the natural language understanding result, reasoning knowledge, the pet attributes and/or pet master attributes, and the language characteristics of the pet master stored in the pet master language information base.

Through the automatic questioning and answering technology and on the basis of a natural language processing method, embodiments of the present invention enable the pet to chat with the user in the natural language. During the long-term conversation with the user, the pet can learn the language characteristics, such as commonly-used catch phrases and commonly-used mood of the user. These language characteristics and language styles are embodied in the response of the virtual pet to the question of the user, so that the user can enjoy much more intelligent entertainment experiences.

Figure 4:
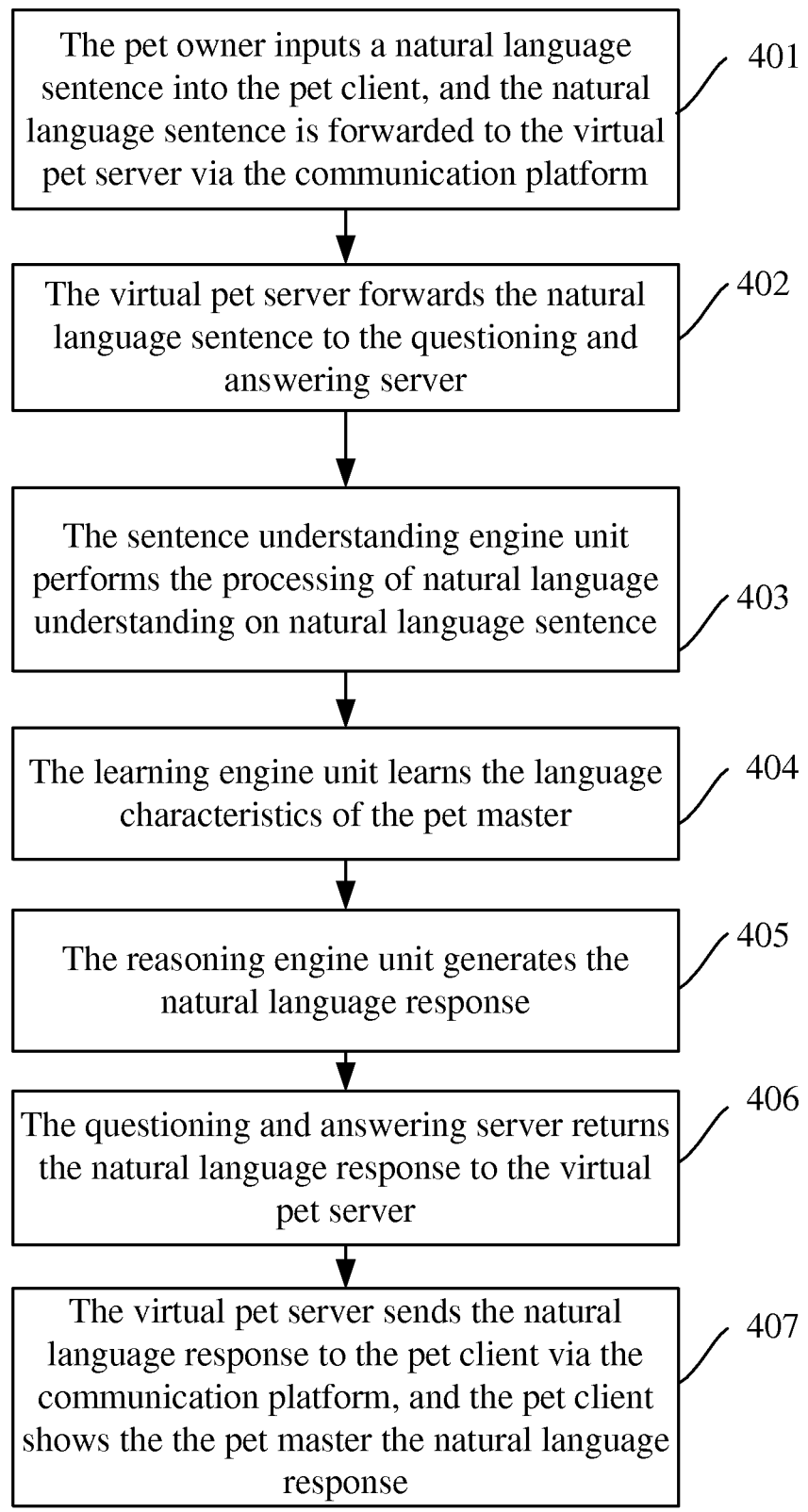
FIG. 4 is a flow chart of a chatting method for a virtual pet according to a fourth embodiment of the present invention.

FIG. 4 is a flow chart illustrating a chatting method for a virtual pet according to the fourth embodiment of the present invention. As illustrated in FIG. 4, the method includes:

Block 401: The pet master inputs a natural language sentence into the pet client. The natural language sentence is sent to the virtual pet server via the communication platform.

Block 402: The virtual pet server forwards the natural language sentence to the questioning and answering server.

Block 403: The sentence understanding engine unit of the questioning and answering server performs the processing of natural language understanding on the natural language sentence.

Block 404: The learning engine unit of the questioning and answering server learns the language characteristics of the pet master.

Block 405: The reasoning engine unit of the questioning and answering server generates the natural language response.

Block 406: The questioning and answering server returns the generated natural language response to the virtual pet server.

Block 407: The virtual pet server sends the natural language response to the virtual pet client via the communication platform, and the virtual pet client shows the pet master the natural language response.

In summary, the chatting system in the embodiments of the present invention has a function of chatting and speaking with a virtual pet, and adopts the artificial intelligence technology and natural language processing abilities to provide a virtual pet user with much more entertainment experiences. The experiences specifically include the following:

First, dialogues between the virtual pet and the virtual pet master can be implemented, which makes the virtual pet much more intelligent and recreational.

Second, the virtual pet may keep learning the language characteristics of its master and may reflect the language characteristics of its master in its own languages, which makes the relation between the user and the pet closer.

Third, load balancing between the virtual pet server and the questioning and answering server is guaranteed by the dispatch server located between the communication platform and the virtual pet server.

The foregoing are merely preferred embodiments of the present invention, but are not used for limiting the present invention. A skilled person in the art should understand that various changes can be made in its form and details without departing from the spirit or scope of the present invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A chatting system for a virtual pet, comprising:
   a pet client device including a processor coupled to a memory storing instructions for execution by the processor receiving a natural language sentence of a pet master and sending the natural language sentence to a virtual pet server device including a processor coupled to a memory storing instructions for execution by the processor;
   the virtual pet server device forwarding the natural language sentence to a question and answer server device including a processor coupled to a memory storing instructions for execution by the processor, and return a natural language response to the pet client device;
   the question and answer server device processing natural language understanding on the natural language sentence; obtaining language characteristics of the pet master and save the language characteristics of the pet master into a pet master language information base; generating the natural language response according to a natural language understanding result and the saved language characteristics of the pet master; and returning the natural language response to the virtual pet server device; wherein the language characteristics of the pet master include response habits commonly used by a user for responding to a certain natural language;
   the question and answer server device further adjusting the language characteristics of the pet master according to the natural language understanding result, history chatting records of the pet master, and the saved language characteristics of the pet master, and save the adjusted language characteristics of the pet master into the pet master language information base.

2. The chatting system according to claim 1, wherein the virtual pet server device manages pet attributes and sends the pet attributes to the question and answer server device; and the question and answer server device further generates the natural language response according to the natural language understanding result, the language characteristics of the pet master and the pet attributes.

3. The chatting system according to claim 2, wherein the pet attributes are stored in a pet attribute base connected with the virtual pet server device.

4. The chatting system according to claim 3, wherein the pet attribute base stores pet master attributes; and the question and answer server device further generates the natural language response according to the natural language understanding result, the language characteristics of the pet master, and the pet attributes and/or the pet master attributes.

5. The chatting system according to claim 1, wherein the pet master language information base stores the language characteristics of the pet master and the adjusted language characteristics of the pet master.

6. The chatting system according to claim 5, the pet master language information base is set in the questioning and answering server device, or set independently.

7. The chatting system according to claim 1, further comprising: a communication platform between the pet client device and the virtual pet server device; wherein the communication platform forwards the natural language sentence and the natural language response between the pet client device and the virtual pet server device.

8. The chatting system according to claim 7, wherein the communication platform is an Instant Messaging, IM, communication platform, a short messaging service communication platform, a network interface communication platform, or an Email communication platform.

9. The chatting system according to claim 7 further comprising at least two virtual pet server devices, and the system further comprises a dispatch server set between the communication platform and the at least two virtual pet server devices; and the dispatch server receives the natural language sentence of the pet master from the communication platform, and dispatch the natural language sentence to each virtual pet server device according to a load balancing principle.

10. The chatting system according to claim 1, the pet client device is set in an IM tool.

11. A question and answer server, comprising:
a processor coupled to a memory storing instructions for execution by the processor;
a sentence understanding engine module, when the instructions are executed by the processor processing natural language understanding on a natural language sentence received by the question and answer server, causing the question and answer server to send a natural language understanding result respectively to a learning engine unit and a reasoning engine unit, and causing the question and answer server to send a natural language response generated by the reasoning engine unit;

the learning engine module, when the instructions are executed by the processor, obtaining language characteristics of a pet master according to a natural language understanding result, and save the language characteristics into a pet master language information base, wherein the language characteristics of the pet master include response habits commonly used by a user for responding to a certain natural language; and the reasoning engine module generating the natural language response according to the natural language understanding result and the saved language characteristics of the pet master; and the pet master language information base storing the language characteristics of the pet master, the learning engine unit, when the instructions are executed by the processor, further adjusting the language characteristics of the pet master according to the natural language understanding result, history chatting records of the pet master, or the saved language characteristics of the pet master, and saving the adjusted language characteristics into the pet master language information base.

12. The question and answer server according to claim 11, further comprising a knowledge base, saving reasoning knowledge, and wherein the reasoning engine unit generates the natural language response according to the natural language understanding result, the language characteristics of the pet master, or the reasoning knowledge.

13. The question and answer server according to claim 12, wherein the knowledge base stores the reasoning knowledge in a format of a pair of questioning and answering sentences.

14. The question and answer server according to claim 12, wherein the reasoning engine unit obtains pet attributes or pet master attributes, and generates the natural language response according to the natural language understanding result, the reasoning knowledge stored in the knowledge base, the pet attributes, the pet master attributes, or the language characteristics in the pet master language information base.

15. The question and answer server according to claim 11, wherein the sentence understanding engine unit performs operations including word segmentation, question trunk extraction, question type determination, or topic determination on the natural language sentence.

* * * * *